(12) United States Patent
Wang et al.

(10) Patent No.: US 11,913,409 B2
(45) Date of Patent: Feb. 27, 2024

(54) AFTERBURNER STRUCTURE WITH SELF-EXCITED SWEEPING OSCILLATING FUEL INJECTION NOZZLES

(71) Applicant: AERO ENGINE ACADEMY OF CHINA, Beijing (CN)

(72) Inventors: Shiqi Wang, Beijing (CN); Quan Wen, Beijing (CN); Xiao Han, Beijing (CN)

(73) Assignee: AERO ENGINE ACADEMY OF CHINA, Beijing (CN)

( * ) Notice: Subject to any disclaimer, the term of this patent is extended or adjusted under 35 U.S.C. 154(b) by 0 days.

(21) Appl. No.: 18/173,175

(22) Filed: Feb. 23, 2023

(65) Prior Publication Data

US 2023/0392565 A1 Dec. 7, 2023

Related U.S. Application Data

(63) Continuation of application No. PCT/CN2022/071871, filed on Jan. 13, 2022.

(30) Foreign Application Priority Data

May 13, 2021 (CN) .......................... 202110519916.8

(51) Int. Cl.
*F02K 3/10* (2006.01)
*F23R 3/20* (2006.01)

(52) U.S. Cl.
CPC .................. *F02K 3/10* (2013.01); *F23R 3/20* (2013.01); *F05D 2240/36* (2013.01); *F23D 2900/14482* (2013.01)

(58) Field of Classification Search
CPC ............ F02K 3/10; F23D 2900/14482; F02M 61/1806; F15B 21/12; B05B 1/08
See application file for complete search history.

(56) References Cited

U.S. PATENT DOCUMENTS 3,748,852 A * 7/1973 Cole .......................... F02K 9/52
60/725
5,456,594 A * 10/1995 Yap .......................... F23C 15/00
431/1

(Continued)

FOREIGN PATENT DOCUMENTS

CN 1211310 A 3/1999
CN 101776283 A 7/2010

(Continued)

OTHER PUBLICATIONS

China 2021105199168 Notification of the First Office Action dated May 23, 2022.
PCT PCT/CN2022/071871 International Search Report dated Apr. 13, 2022.

*Primary Examiner* — Alain Chau
(74) *Attorney, Agent, or Firm* — IPRO, PLLC (57) ABSTRACT

The present disclosure relates to an afterburner structure with fuel injection nozzles. In the condition of a stable inlet flow, the present disclosure forms a sweeping oscillating jet with a certain frequency at the outlet under an alternate feedback action of a feedback channel and the fluid's Coanda effect, so that the spatial uniformity of the fuel injection is improved; Therefore, without increasing the structural complexity of current afterburner of the turbo-engine and the combustion chamber of the subsonic combustion ramjet, the atomization performance and the uniformity of the oil-gas mixture in the afterburner/combustion chamber of the ramjet can be greatly improved, the combustion efficiency and combustion instability of the engine can be improved and meanwhile the length of the afterburner and the combustion chamber of the subsonic combustion ramjet is shortened.

8 Claims, 11 Drawing Sheets

(56) References Cited

U.S. PATENT DOCUMENTS

| | | | |
|---|---|---|---|
| 5,685,140 A | 11/1997 | Clements et al. | |
| 7,128,082 B1* | 10/2006 | Cerretelli | B05B 7/0075 |
| | | | 137/833 |
| 8,209,987 B2* | 7/2012 | Hautman | F23R 3/20 |
| | | | 60/761 |
| 11,471,898 B2* | 10/2022 | Bobusch | F15B 21/12 |
| 2004/0216444 A1 | 11/2004 | Lovett | |
| 2007/0006589 A1 | 1/2007 | Muldoon et al. | |
| 2010/0101208 A1* | 4/2010 | Lovett | F23R 3/20 |
| | | | 60/761 |
| 2010/0123031 A1 | 5/2010 | Weber | |
| 2010/0126177 A1* | 5/2010 | Hautman | F02K 3/10 |
| | | | 60/752 |
| 2011/0083516 A1 | 4/2011 | Vaidya | |
| 2011/0094308 A1 | 4/2011 | Vaidya | |
| 2013/0192237 A1* | 8/2013 | Oskam | F23R 3/286 |
| | | | 60/746 |
| 2017/0254541 A1 | 9/2017 | Ttcher et al. | |
| 2018/0318848 A1* | 11/2018 | Bobusch | F15B 21/12 |
| 2020/0032709 A1 | 1/2020 | Chilukuri | |
| 2020/0238304 A1* | 7/2020 | Bobusch | F02M 61/1806 |
| 2022/0055044 A1* | 2/2022 | Bobusch | F15B 21/12 |

FOREIGN PATENT DOCUMENTS

| | | | | |
|---|---|---|---|---|
| CN | 102538010 A | 7/2012 | | |
| CN | 104549805 A | 4/2015 | | |
| CN | 105240095 A | 1/2016 | | |
| CN | 105435976 A | 3/2016 | | |
| CN | 106594800 A | 4/2017 | | |
| CN | 106662328 A | 5/2017 | | |
| CN | 106678876 A | 5/2017 | | |
| CN | 109611214 A | 4/2019 | | |
| CN | 209588046 U | 11/2019 | | |
| CN | 110833373 A | 2/2020 | | |
| CN | 111623010 A | 9/2020 | | |
| CN | 111810454 A | 10/2020 | | |
| CN | 211781231 U | 10/2020 | | |
| CN | 112547330 A | 3/2021 | | |
| CN | 113280366 A | 8/2021 | | |
| EP | 2644999 A1 * | 10/2013 | ................ | F23R 3/28 |
| JP | 0979088 A | 3/1997 | | |
| SU | 1432287 A1 | 10/1988 | | |
| WO | 2016012962 A1 | 1/2016 | | |

\* cited by examiner

AFTERBURNER STRUCTURE WITH SELF-EXCITED SWEEPING OSCILLATING FUEL INJECTION NOZZLES

FIELD OF THE INVENTION

The present disclosure relates to the technical field of fuel injection and structure design of aero-engines, and more particularly to the fuel injection and structure of an afterburner.

BACKGROUND OF THE INVENTION

Certain aero-engines cannot possess excellent performance over the entire thrust range. For example, aircrafts need much more thrust when taking off than when cruising. If the engine is designed according to the take-off thrust, the mass of the engine will be too large, and the engine is in a non-design point status when cruising and thus has a poor performance; if the engine is designed according to the cruising thrust, the aircraft will not take off normally. One of the measures to solve the above problems is to add an afterburner between the gas turbine and the nozzle of the engine, which can greatly increase the engine thrust in a short period of time. Although the mass of the afterburner is only about ⅕ of the mass of the engine, the thrust can be increased by more than 60%. At present, main military engines in the world basically adopt the structure with an afterburner.

Figure 1:
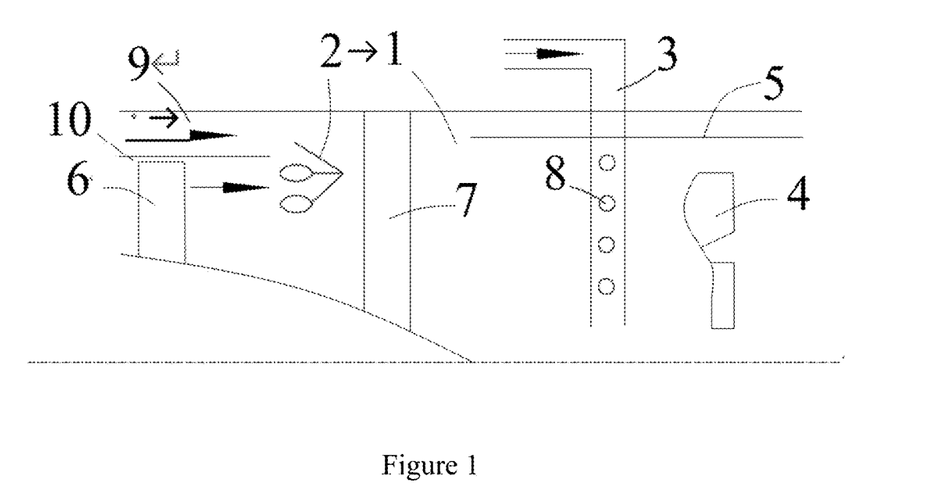
FIG. 1 is a schematic diagram of a conventional afterburner.

The traditional afterburner is mainly composed of a diffuser 1, a mixer 2, an ignition device (not shown), an injection rod 3, a flameholder 4, a pre-combustion chamber (not shown), a heat shield 5, a fuel manifold, turbine blades 6, fairing strut 7, nozzle 8, bypass duct 9, core duct 10 and other components (as shown in FIG. 1). The high-temperature airflow discharged from the turbine and the bypass air enter the afterburner, and are mixed by the mixer to form an airflow with a uniform pressure, speed and temperature; The airflow is pressurized and decelerated via the diffuser, mixed with the fuel, and ignited under the action of the ignition device and the flameholder; the burnt gas flows back forward and ignites the subsequent oil and gas mixture, so that the gas in the afterburner is fully burned, and the purpose of increasing the jet speed and thrust is achieved. The combustion chamber of the subsonic combustion ramjet usually adopts the fore-mentioned form too.

At present, the liquid fuel of the turbo-engine with an afterburner and the subsonic combustion ramjet is mainly injected via the plain-orifice injection nozzles on the fuel injection rod in a direction perpendicular to the main flow or at a certain angle with the main flow. Under the transverse action of the high-speed airflow, the fuel undergoes a process of once crushing and twice atomization, gradually changes from liquid columns to liquid fragments and small droplets (as shown in FIG. 1), completes evaporation in a high temperature environment and forms a flammable mixture with the air in the afterburner. For a liquid fuel, atomization is the first step to complete the mixing of oil and gas. If the jet atomization process of the fuel in the air flow is carried out well, the diameter of the droplets after atomization is small and uniform, and it is beneficial for the mixing of fuel and air, and will bring great benefits to the combustion. Good fuel atomization and uniform oil-gas mixing are the prerequisites for high-efficiency combustion. Improving the quality of the spray formed after jet atomization and improving the spatial distribution uniformity of the oil mist can effectively improve the efficiency and stability of combustion.

In order to pursue higher thrust-to-weight ratio and work efficiency, the next-generation engine requires a certain degree of integrated design of the turbine's rear frame, fairing strut, fuel injection nozzle, flameholder and other components so as to decrease the length and weight of the afterburner. However, if the traditional plain-orifice fuel injection nozzle is still used in the afterburner and the combustion chamber of the subsonic combustion ramjet, although its structure is simple, the spatial distribution of the injected fuel is extremely uneven, which will seriously affect the combustion efficiency; Moreover, the distance in the flow direction for atomizing and mixing in a high-speed transverse airflow is too long, and it is difficult to achieve the requirement of further reducing the length of the afterburner of the next-generation engine; meanwhile, the inlet temperature of the next-generation afterburner is higher, and the autoignition delay time is shorter, therefore, in order to complete a good atomization, evaporation and mixing of the fuel within 50 mm so as to avoid autoignition of the fuel, it is hard for the ordinary plain-orifice fuel injection nozzles to achieve the above design goals.

SUMMARY OF THE INVENTION

In order to solve at least one of the above technical problems, the present disclosure provides an afterburner structure with fuel injection nozzles, which can greatly improve the atomization performance and spatial distribution uniformity of the fuel in the afterburner/ramjet combustion chamber without increasing the structural complexity of current afterburner of the turbo-engine and the combustion chamber of the subsonic combustion ramjet, thereby improving the combustion efficiency and combustion instability of the engine, and shortening the length and weight of the afterburner and the combustion chamber of the subsonic combustion ramjet. The object of the present disclosure is achieved by the following solutions.

An afterburner structure with fuel injection nozzles, which comprises a casing, a central fairing cone located in the casing, a number of airfoil struts connecting the central fairing cone and the inner wall of the casing, the airfoil struts are evenly arranged around the central fairing cone; the airfoil struts are provided with a number of fuel injection nozzles, and the injection direction of the fuel injection nozzles is perpendicular to the direction of the incoming flow in the engine; each fuel injection nozzle includes a fuel injection nozzle body, an oscillating chamber in the body, a feedback channel connected with the oscillating chamber, and a spout connected with the oscillating chamber and suitable for injecting fuel to the engine; the fuel is output in a fan/sweeping-fan shape through the spout and is dispersed by the incoming flow.

Further, the direction of the spout of the fuel injection nozzle forms an angle α with the tangential line to the surface of the airfoil strut where the spout is located. Further, the spout is located within the range of 10% to 90% of the chord length in the cross section of the airfoil strut.

Further, the sweeping angle of the fan shape is from 5° to 160°.

Further, if internal flow passages of adjacent fuel injection nozzles have the same size, distances between adjacent fuel injection nozzles satisfy the following relationship:

$$(Li+d1)^2 - Li^2 = (Li+d1\pm d2)^2 - (Li+d1)^2$$

Wherein, Li is the distance between the first spout which is close to the central axis of the engine and the central axis of the engine; d1 is the distance between the spout which is close to the central axis of the engine and its adjacent second spout; d2 is the distance between the third spout which is adjacent to the second spout and the second spout.

Further, if d1=d2=d, then equivalent flow areas of fuel between adjacent fuel injection nozzles need to meet:

$$A1/[(Li+d)^2-Li^2]=A2/[(Li+2d)^2-(Li+d)^2]$$

Wherein, A1 is the cross-sectional area of the inlet throat of the first nozzle, and A2 is the cross-sectional area of the inlet throat of the second nozzle.

Further, the oscillating chamber is provided with a fluid inlet, and vortices are generated when main fluid of the fluid flows through the oscillating chamber, and the main fluid is forced to flow against one side wall of the oscillating chamber by the vortices, and is deflected in one direction at the spout of the oscillating chamber;

The feedback channel is connected with the oscillating chamber, and the feedback channel is used to transmit control fluid, and the control fluid drives the main fluid to flow towards the other side wall and to deflect in the other direction at the spout.

Further, the fuel injection nozzle has two feedback channels, the two feedback channels are symmetrically distributed on two sides of the oscillating chamber, the feedback channels are designed for introducing branch fluid to the main fluid, and the inlet of the feedback channel is close to the spout, the outlet of the feedback channel is close to the fluid inlet of the oscillating chamber.

Further, the cross-sectional area of the middle part of the oscillating chamber is larger than that of the inlet of the oscillating chamber and that of the spout.

Further, the middle of the airfoil strut is provided with a rib, the rib separates the airfoil strut into two cavities, and the middle part of the rib is provided with a fuel passage that communicates the fuel injection nozzle with a fuel pump.

Compared with the prior art, the advantages of the present disclosure lie in: it provides an afterburner structure with fuel injection nozzles, the interior of the afterburner is provided with fuel injection nozzles, and each of the fuel injection nozzle includes a fuel injection nozzle body, an oscillating chamber and a feedback channel provided in the fuel injection nozzle body, and a spout connected with the oscillating chamber and suitable for injecting fuel to the engine; the fuel is output in a fan shape through the spout and is dispersed by the incoming flow. In the condition of a stable inlet flow, the present disclosure forms a sweeping jet at the outlet under the alternate feedback action of the feedback channel and the fluid's Coanda effect. Therefore, without increasing the structural complexity of current afterburner of the turbine engine and the combustion chamber of the subsonic combustion ramjet, the atomization performance and spatial distribution uniformity of the fuel can be greatly improved, the combustion efficiency and combustion instability of the engine can be improved and meanwhile the length of the afterburner and the combustion chamber of the subsonic combustion ramjet is shortened.

BRIEF DESCRIPTION OF DRAWINGS

The accompanying drawings illustrate exemplary embodiments of the present disclosure and are used to explain the principles of the present disclosure in conjunction with corresponding description, the accompanying drawings provide a further understanding of the present disclosure and are incorporated in and constitute a part of this specification.

Wherein, 1—diffuser, 2—mixer, 3—injection rod, 4—flameholder, 5—heat shield, 6—turbine blades, 7—fairing strut, 8—nozzle, 9—bypass duct, 10—core duct; 110—casing, 120—bypass turbine, 130—core turbine, 140—central fairing cone, 150—airfoil strut, 151—fuel passage, 152—fuel injection nozzle, 153—trailing blunt structure, 154—injection direction, 160—shockproof barrier, 170—mixer, 180—igniter, 190—fuel pump, 200—bypass duct, 300—core duct, 400—incoming flow, 500—oscillator, 510—fuel injection nozzle body, 520—oscillating chamber, 530—feedback channel, 540—spout, 550—inlet, 600—main fluid.

DETAILED DESCRIPTION OF THE INVENTION

The present disclosure will be clearly and completely described below with reference to the accompanying drawings and specific embodiments. It can be understood that the embodiments described here are only used to illustrate relative contents rather than limiting the scope of the present disclosure. In addition, it should also be noted that, only the parts related to the present invention are shown in the drawings for the convenience of description.

It should be noted that the embodiments of the present disclosure and the features of the embodiments may be combined with each other if there is no conflict. The present disclosure will be described in detail below with reference to the accompanying drawings in conjunction with the embodiments.

Figure 2:
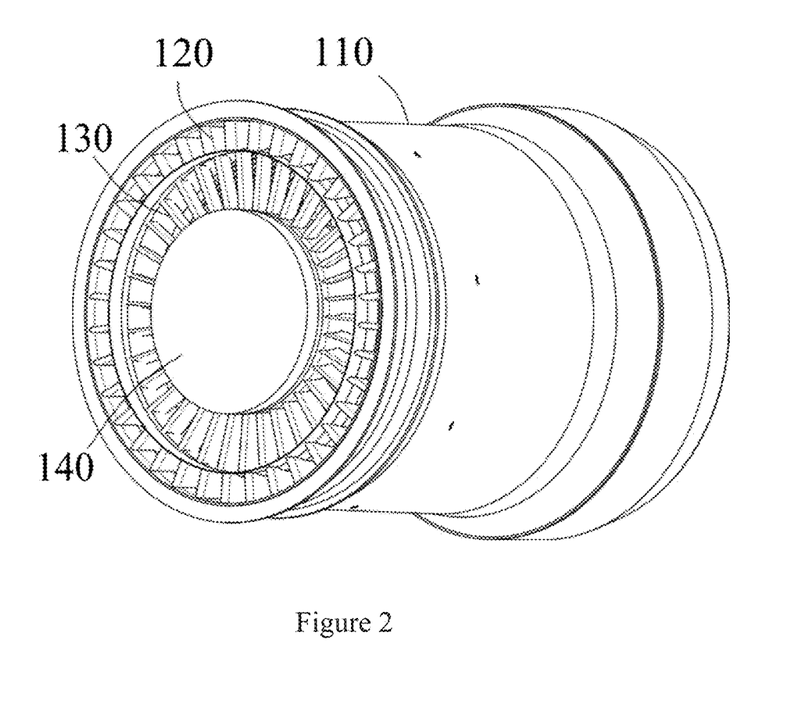
FIG. 2 is a schematic diagram of an afterburner structure with fuel injection nozzles of the present disclosure.
Figure 4:
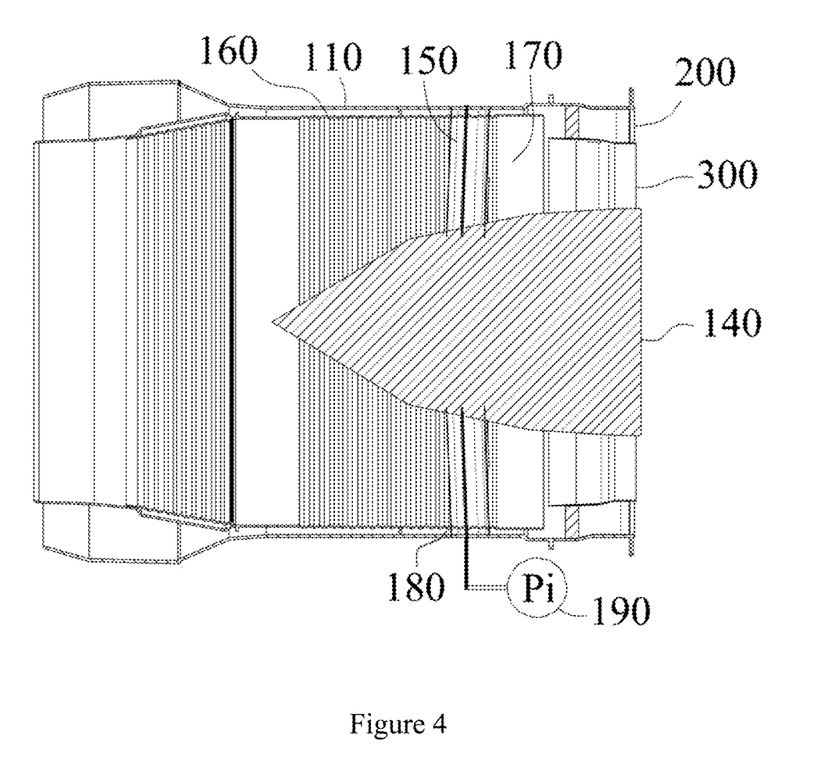
FIG. 4 is a schematic cross-sectional view of the afterburner in FIG. 2 along the central axis.

As shown in FIG. 2 and FIG. 4, the present disclosure provides an afterburner structure with fuel injection nozzles 152. Engine comprises a casing 110, a bypass turbine 120, a core turbine 130 and a central fairing cone 140. Wherein, the central fairing cone 140 is arranged at the center of the engine, and the engine is divided into a bypass duct 200 and a core duct 300 at its inlet by walls. The bypass turbine 120 is arranged in the bypass duct 200 and the core turbine 130 is arranged in the core duct 300.

Figure 3:
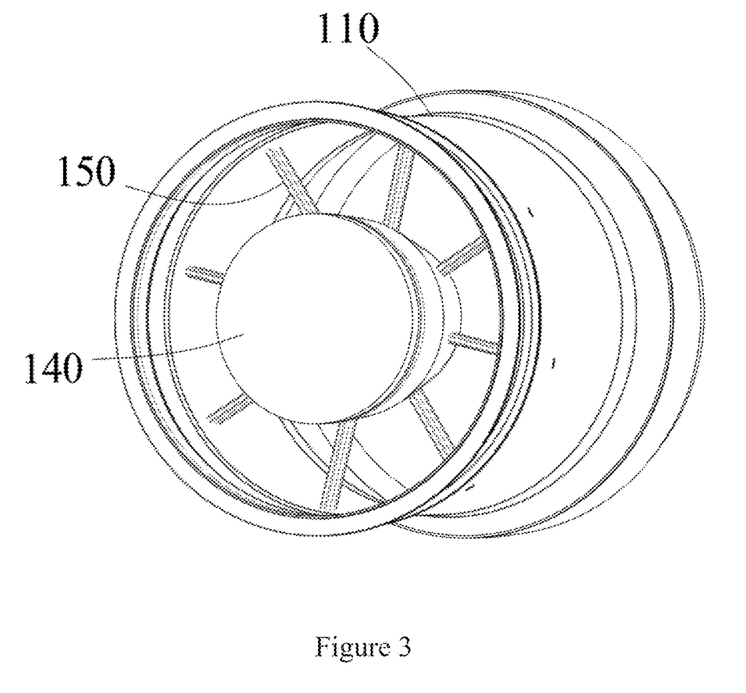
FIG. 3 is a schematic diagram of the internal structure of FIG. 2 after removing the turbine.

As shown in FIG. 3, the afterburner (engine) of the present disclosure further comprises an airfoil strut 150. Specifically, the airfoil strut 150 is positioned behind the bypass turbine 120 and core turbine 130. In FIG. 3, the bypass turbine 120 and core turbine 130 are removed, such that the airfoil strut 150 can be seen.

As shown in FIG. 4, a shockproof barrier 160 is arranged within the casing 110.

The shockproof barrier 160 is used to isolate the noise and vibration generated in the engine and to prevent excessive noise and vibration from being transmitted into the interior of the aircraft. The rear space of the airfoil strut 150 is the combustion chamber, and the shockproof barrier 160 is arranged on the inner wall of the casing 110 of the combustion chamber. Preferably, the shockproof barrier 160 also has a function of heat insulation.

A mixer 170 is arranged behind the bypass turbine 120 and core turbine 130. In the mixer 170, the air sucked by the bypass turbine 120 and core turbine 130 is mixed to generate a transverse airflow and the mixed transverse airflow is further transmitted towards the airfoil strut 150. A fuel passage 151 is provided in the middle of the airfoil strut 150 and is connected with an external fuel pump 190. A plurality of new fuel injection nozzles 152 used for injecting fuel into the interior of the combustion chamber are disposed on the surface of the airfoil strut 150. Under the action of the high-speed transverse airflow input by the bypass turbine 120 and core turbine 130, the fuel injected by the fuel injection nozzles 152 is rapidly diffused and fully mixed in the combustion chamber.

The afterburner (combustion chamber) is also provided with an igniter 180 at the position close to the airfoil strut 150. The fully mixed gas is burned under the ignition action of the igniter 180, and the high-speed jet gas pushes the turbine on the rear side and drives the bypass turbine 120 and core turbine 130 in front of the engine. Preferably, the airfoil struts 150 are evenly arranged around the central fairing cone 140, so that the fuel could be uniformly injected into the afterburner by the fuel injection nozzles 152.

The airfoil strut 150 is preferably to be an integrated airfoil strut, which can effectively support the outer casing of the afterburner and the shape of which has an extremely small flow resistance, such that a high flow efficiency can still be maintained in the flight conditions without turning on the afterburner. In the high-temperature incoming flow environment of the afterburner, the internal cavity structure of the airfoil strut also facilitates the arrangement of airflow cooling or fuel cooling flow paths. At the same time, the internal cavity structure of the airfoil strut also greatly facilitates the installation and arrangement of the fuel injection nozzles.

Figure 9A:
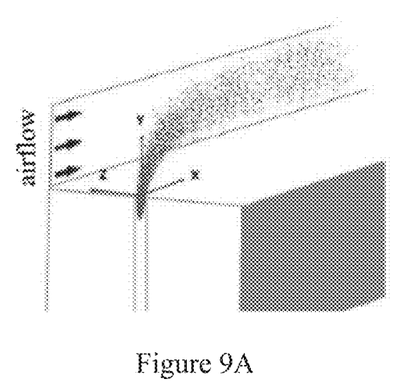
FIG. 9A is a schematic diagram of fuel injection by a plain-orifice injection nozzle.
Figure 9B:
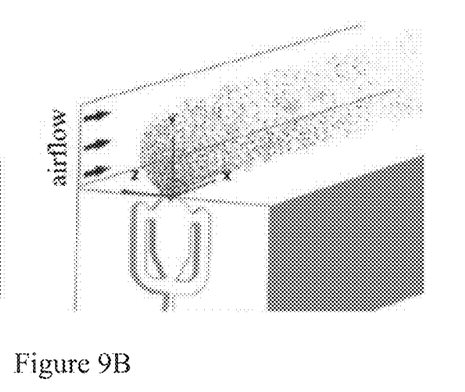
FIG. 9B is a schematic diagram of fuel injection by the fuel injection nozzle.

Generally, the uniformity of fuel and air mixing will determine the adequacy and quality of combustion. The fuel injection nozzles 152 can spread the fuel in a large space and evenly mix it with the air under the action of the high-speed transverse airflow, thus effectively improve the combustion efficiency. The use of direct fuel atomization leads to a low fuel injection efficiency (FIG. 9A), and the use of sweeping fuel injection usually requires to introduce a mechanical control structure or an electromagnetic control mechanism, which increases the complexity of the engine. The present disclosure creatively introduces a new type of fuel injection nozzle 152 with a self-excited sweeping-type oscillation. Under the injection of high-pressure oil, the self-excited oscillation chamber is used to generate high-frequency sweeping-type oscillating oil output (FIG. 9B), such that mechanical kinematic structures or electromagnetic structures are not needed.

Referring to FIGS. 8A-10B, the fuel injection nozzle 152 is an oscillator 500. The oscillator comprises a fuel injection nozzle body 510, an oscillating chamber 520 arranged in the body, a feedback channel 530 connected with the oscillating chamber 520 and a spout 540 connected with the oscillating chamber 520 and adapted to inject fuel to the engine; the fuel is sprayed out in a fan shape through the spout and then dispersed by the incoming flow 400.

Figure 10A:
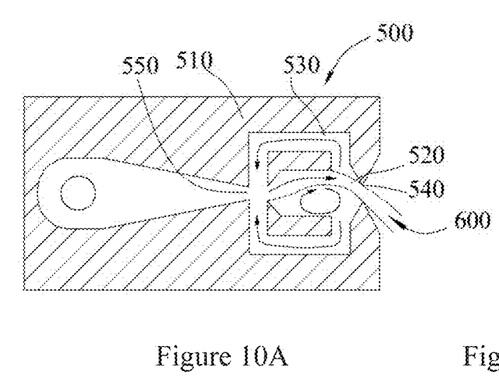
FIG. 10A is α detailed schematic diagram of the fuel injection nozzle in FIG. 9B.
Figure 10B:
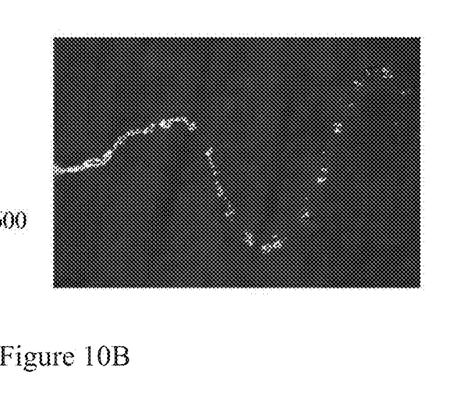
FIG. 10B is α transient image of the sweeping liquid column at the outlet of the fuel injection nozzle.

The oscillating chamber is provided with a fluid inlet 550, and main fluid 600 of the fluid is adapted to generate vortices when passing through the oscillating chamber, such that the main fluid 600 flows against one side wall of the oscillating chamber, and is deflected in one direction at the spout of the oscillating chamber. The feedback channel is connected with the oscillating chamber and used to transmit a control fluid which drives the main fluid to flow towards the other side wall and to deflect in the other direction at the spout (FIG. 10B). Two feedback channels 530 are symmetrically distributed on the two sides of the oscillating chamber 520, the feedback channels 530 are designed for introducing a branch fluid to the main fluid, and the inlet of the feedback channel is close to the spout 540, and the outlet of the feedback channel is close to the fluid inlet 550.

Preferably, the cross-sectional area of the middle part of the oscillating chamber is larger than that of the inlet of the oscillating chamber and that of the spout 540, such that the fuel can be injected into the oscillating chamber, and the fuel is adapted to flow against the wall of the oscillating chamber and generate vortices.

In this embodiment, the fuel injection nozzle 152 has two feedback channels.

Specifically, the oscillating chamber of the fuel injection nozzle 152 is provided with a fluid inlet. Two feedback channels are symmetrically distributed on two sides of the oscillating chamber, the feedback channels are designed for introducing a branch fluid to the main fluid, the inlet of the feedback channel is close to the spout, and the outlet of the feedback channel is close to the inlet of the oscillating chamber. The cross-sectional area of the middle part of the oscillating chamber is larger than that of the inlet of the oscillating chamber so as to form an inlet throat, and the cross-sectional area of the middle part of the oscillating chamber is larger than that of the spout so as to form an outlet throat.

The inlet usually has a smaller area, and the passage for liquid input has a larger flow passing area, so that the liquid can enter the oscillating chamber at a higher velocity after passing through the inlet. The cross-sectional area of the oscillating chamber is larger than that of the inlet, so it can be known that the flow velocity of the fluid inside the oscillating chamber is slower than that at the inlet.

Due to the concave structure in the oscillating chamber, vortices are easily generated. Under the action of the Coanda effect, the main fluid flows against one side wall of the oscillating chamber, meanwhile, larger vortices are generated on the other side, and the intensity of the vortices is lower. When the liquid passes through the inlet of the feedback channel, since the fluid velocity at the outlet of the feedback channel is greater than that at the inlet of the feedback channel, the liquid pressure at the outlet of the feedback channel is smaller than that at the inlet, such that the liquid is driven to flow from the inlet of the feedback channel to the outlet of the feedback channel and thus the main fluid is driven to be attached to the other side wall of the oscillating chamber. During this process, the above-mentioned larger vortices gradually become smaller, but the strength of the vortices increases continuously, which leads to an increase in the attractive force, so that the main fluid is further attached to this side. New vortices are gradually formed between the main fluid and the wall of the oscillating chamber which the main fluid attached to at the previous stage. The above process realizes that the main fluid is deflected in the other direction at the spout. The main fluid is suitable for generating vortices when passing through the oscillating chamber, which further increases the flow stability, and thereby generates a deflection with a certain frequency.

Figure 11:
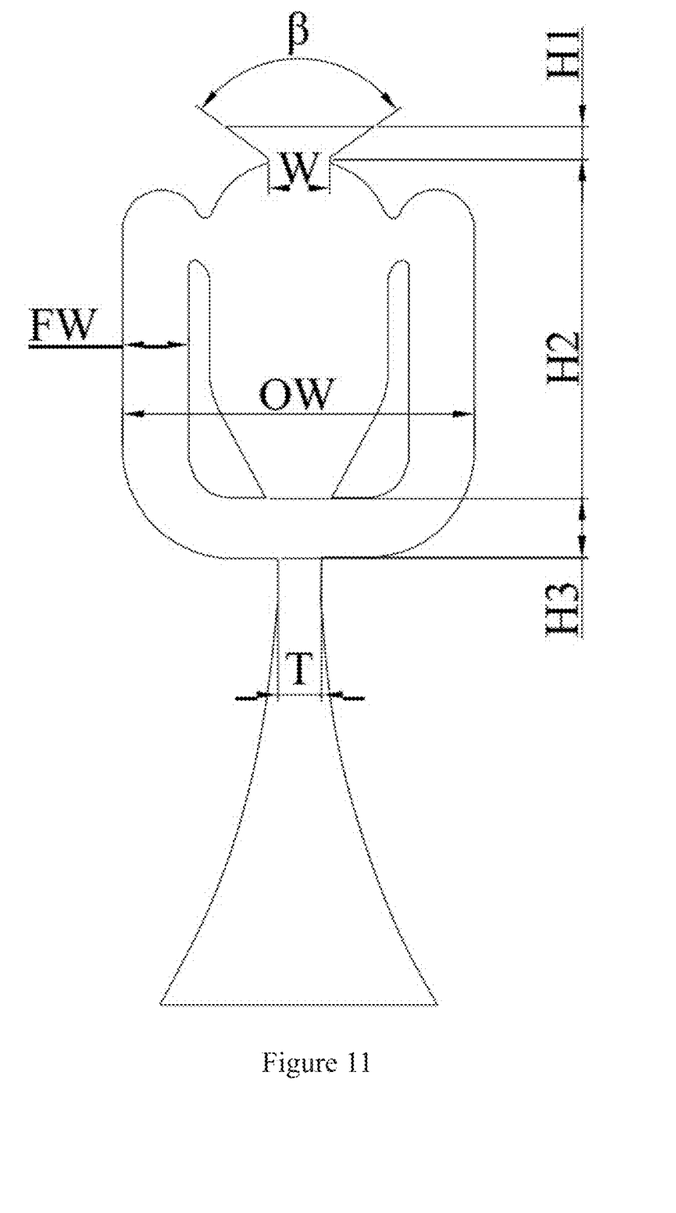
FIG. 11 is a detailed schematic diagram of a fuel injection nozzle.

Although FIG. 11 and FIG. 10A are slightly different in shape, the main structure and size in FIG. 11 are consistent with those in FIG. 10A. The structure in FIG. 11 is another representation of the structure in FIG. 10A. The fine adjustment of their structures does not change the functions and effects of the two structures. Each of the two feedback channels has a width μW, the width of the fuel injection nozzle is OW, the width of the outlet throat is W, the sweeping angle is β, the width of the inlet throat is T, the height of the fan-shape outlet is H1, the height of the oscillator is H2, the height of the feedback channel outlet is H3.

When the width of the inlet throat T is too large, the operating frequency of the oscillator will be too low to form a fan-shape liquid mist. Therefore, in a preferred solution, T<3 mm.

Meanwhile, the working frequency and the sweeping angle are also related to the outlet throat, in a preferred embodiment, 0.2<W/T<4. If the ratio is too small, the sweeping angle formed by the outlet jet is too small, and if the ratio is too large, a fan-shape sweeping liquid mist cannot be formed at the outlet.

Further, the height of the fan-shape outlet H1 satisfies 0<H1/W<5. This height can limit the coverage of the outlet fan-shape sweeping liquid mist. If the ratio is too large, the energy loss when the outlet jet flows out of the sectorial area will be too high, which cannot achieve an effective penetration depth.

The sweeping angle of the fan-shape outlet satisfies 5°<β<160°. By adjusting the angle of the fan-shape outlet, the angle of the fan-shape liquid mist surface formed by the fan-shape nozzle can be changed.

The fuel injection nozzle 152 of the present disclosure has a simple internal structure, and can achieve a better atomization effect by means of a fixed flow passage design. Compared with the currently commonly used plain-orifice injection nozzles, its atomization performance and fuel spatial distribution uniformity are significantly improved, and due to the internal cavity structure, the increase in flow resistance is limited, the reduction in flow coefficient is limited, and it is less prone to coking and clogging, and the structural complexity of its implementation is limited. Compared with the traditional swirl atomizing nozzle, the fan-shape spray can be produced under a low pressure drop, which reduces the burden on the fuel pump. Meanwhile, due to the internal cavity structure, its flow resistance is small, the flow coefficient is high, and it is not prone to clogging and coking. Moreover, its structure is relatively simple, the processing cost is low, and it is easier to carry out integrated structural design with other components in the afterburner.

In addition, due to the existence of the vortices, there are certain unsteady frequencies when operating, and it is needed to have an optimization in certain frequencies so as to reduce the combustion instability of the afterburner and improve the reliability and life of the afterburner and the subsonic combustion ramjet.

The spout is preferably designed as a flared opening, i.e. the spout expands from a smaller section to a larger section. Under the action of the Coanda effect, the fuel sprayed from the nozzle will be attached to one side of the nozzle wall and sprayed to the outside, and the flared angle of the spout can effectively increase the injection angle of the fuel and enable the fuel to be injected at a sweeping angle. Preferably, the sweeping angle is from 5° to 160°. The afterburner structure based on the fuel injection nozzles 152 provided by the present disclosure adopts self-excited sweeping oscillating nozzles, which can generate fan-shape liquid film or fan-shape liquid mist. Compared with ordinary plain-orifice inject liquid column, the atomization effect of the fan-shape liquid film or liquid mist in a high-speed transverse flow and the uniformity of fuel spatial distribution are significantly improved.

Figure 5:
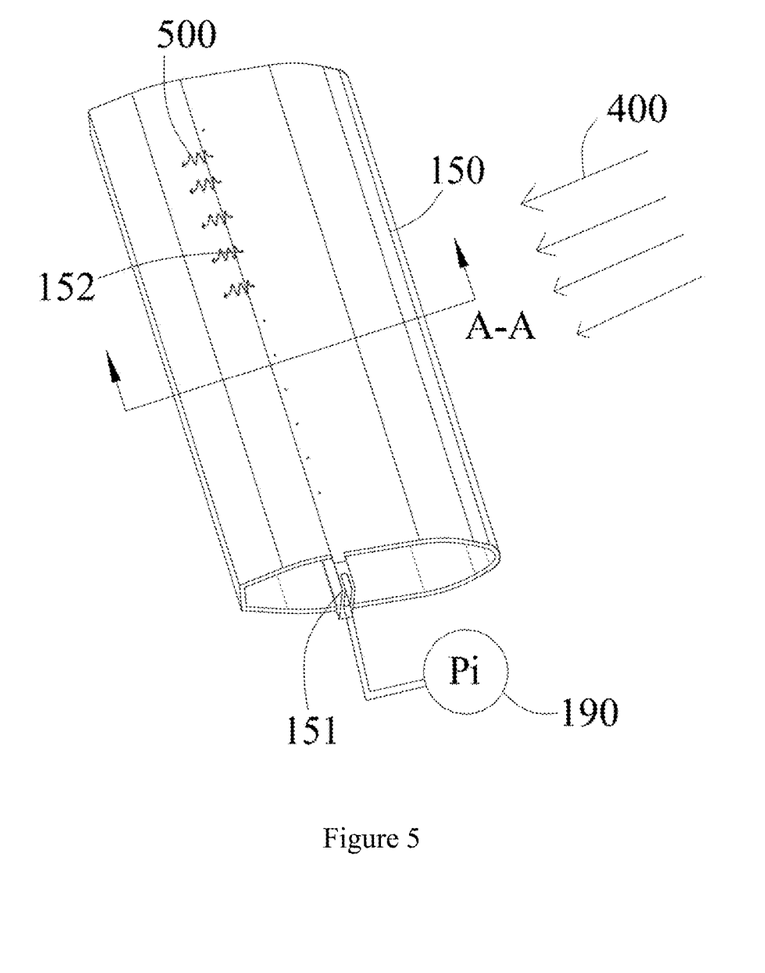
FIG. 5 is a schematic diagram of the airfoil strut in FIG. 3.
Figure 6:
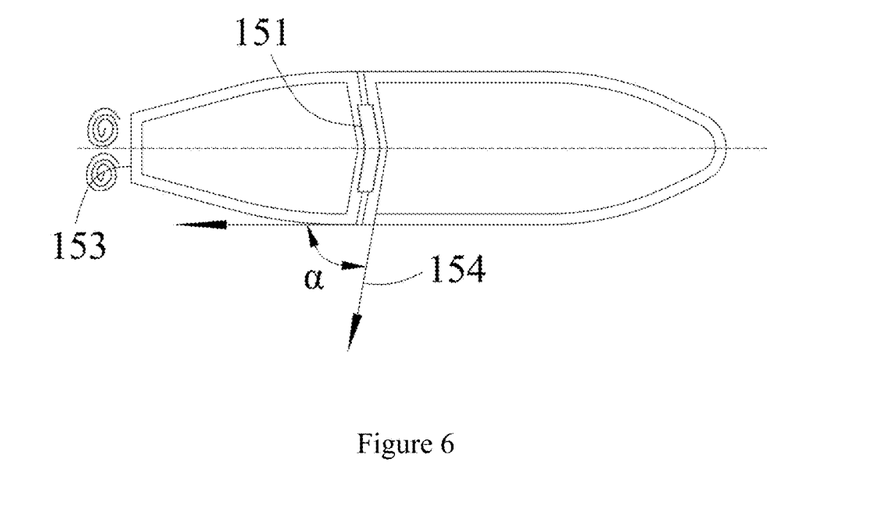
FIG. 6 is a schematic cross-sectional view along the line A-A in FIG. 5.

Referring to FIG. 6, a fuel passage 151 is provided inside the airfoil strut, and the end of the fuel passage is connected with the fuel injection nozzle 152. The trailing blunt structure 153 of the airfoil strut 150 is suitable for generating a low-velocity backflow zone there. The surface of the airfoil strut where the spout of the fuel injection nozzle 152 is located has a tangential line, and the fuel injection nozzle 152 has an injection direction 154 along its spout, and the tangential line and the injection direction 154 form an angle α. The angle α is from 20 degrees to 160 degrees, which enhances the crushing and atomizing effect of the main airflow on the fuel jet. Referring to FIG. 5, the injection direction of the fuel injection nozzle 152 is substantially perpendicular to the incoming flow direction in the afterburner, that is, the flow direction of the above-mentioned transverse airflow, such that the injected fuel is diffused and mixed in the afterburner and which prevents the fuel from adhering to the surface of the airfoil strut. The airfoil strut section in FIG. 5 is a low-resistance airfoil structure, which can significantly reduce the flow loss of the incoming flow, but the airfoil tailing edge adopts a blunt structure to form a low-speed backflow zone at its rear, which can stabilize the flame structure and act as a flameholder.

In a preferred technical solution, the spout is located in the range of 10% chord length to 90% chord length of the cross section of the airfoil strut.

Figure 7:
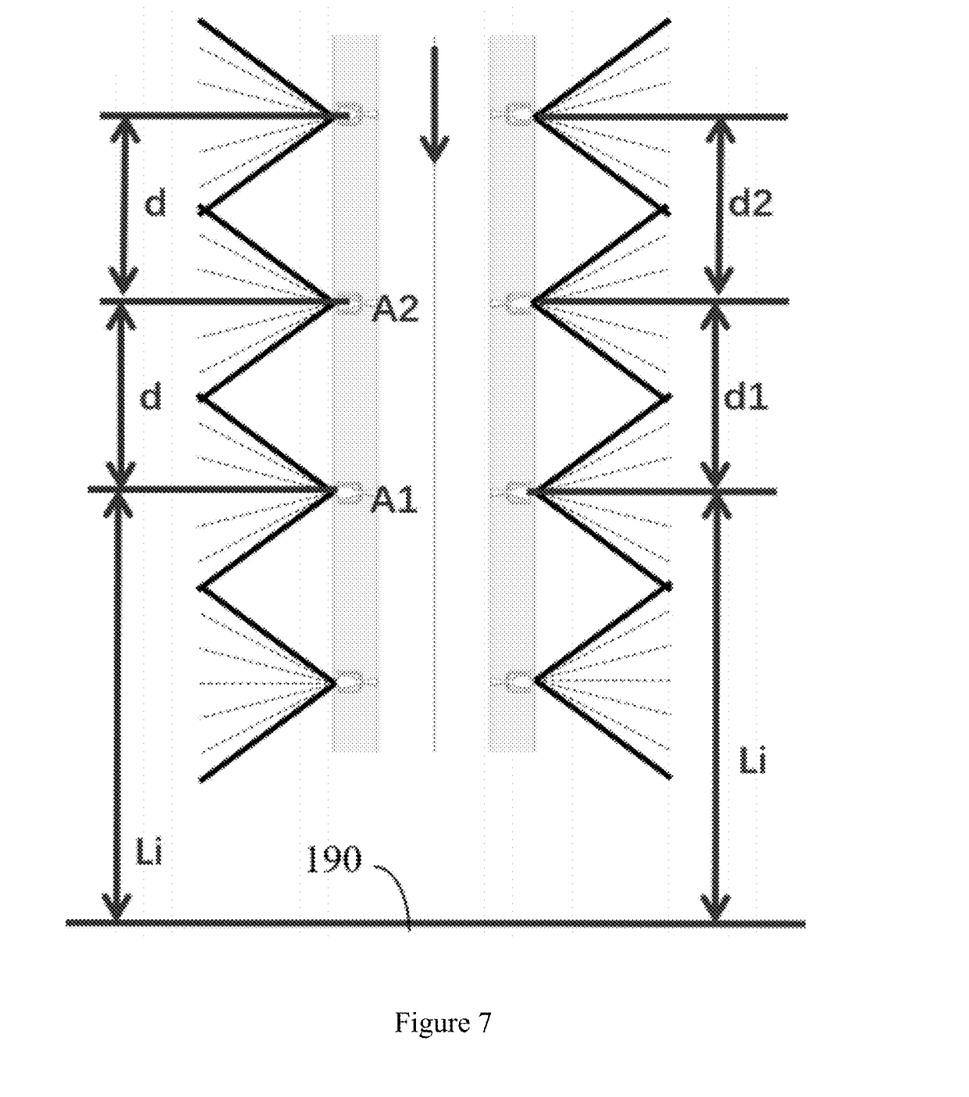
FIG. 7 is a schematic cross-sectional view along the fuel passage in FIG. 5.
Figure 8A:
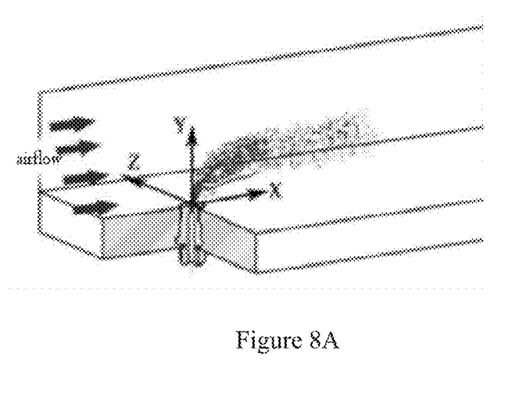
FIG. 8A shows that the plain-orifice injection nozzle injects fuel into the high-speed transverse airflow.
Figure 8B:
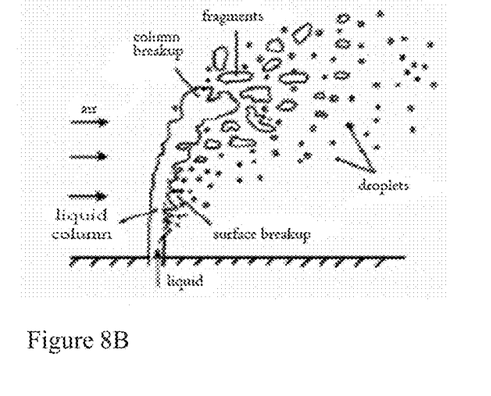
FIG. 8B shows the crushing and atomization process of the liquid fuel in the transverse airflow.

Referring to FIG. 7, two rows of symmetrical internal fuel passages of the fuel injection nozzles are formed in both sides of the airfoil strut. In order to make the fuel spray evenly distributed in the circular passage of the afterburner, if the internal configuration size of each nozzle is the same, the distances between adjacent fuel injection nozzles 152 satisfy the following relationship:

$$(Li+d1)^2-Li^2=(Li+d1\pm d2)^2-(Li+d1)^2$$

Wherein, Li is the distance between the first spout which is close to the central axis of the engine and the central axis of the engine; d1 is the distance between the spout which is close to the central axis of the engine and its adjacent second spout; d2 is the distance between the third spout which is adjacent to the second spout and the second spout.

Further, in order to make the fuel spray evenly distributed in the circular passage of the afterburner, if d1=d2=d, that is, the distribution interval distances between the nozzles are the same, the sizes of the flow passages between adjacent fuel injection nozzles need to be adjusted by a scaling ratio, the scaling ratio satisfies:

$$A1/[(Li+d)^2-Li^2]=A2/[(Li+2d)^2-(Li+d)^2]$$

Wherein, A1 is the inlet throat area of the first nozzle, and A2 is the inlet throat area of the second nozzle. In the above size design, the fuel can be evenly distributed in the space of the afterburner.

By setting the flow passage size and distribution rule of each nozzle in the strut in the above method, on the basis of more uniform distribution of oil mist from a single nozzle, the oil mist formed by multiple nozzles can be distributed more evenly in the entire circular passage of the afterburner, and the problems of local oil-rich or oil-lean areas in the afterburner and resulting local insufficient combustion and local uneven temperature distribution are avoided, thereby improving the overall combustion efficiency in the afterburner, improving the uniformity of the outlet temperature distribution, and finally achieving the purpose of further improving the overall performance of the afterburner and the engine. The afterburner structure based on the fuel injection nozzle provided by the present disclosure greatly improves the atomization capability and spatial distribution uniformity of the fuel in the afterburner, significantly improves the combustion efficiency, and reduces the length of the afterburner and subsonic combustion ramjet. Meanwhile, there are certain unsteady frequencies in the operation of the afterburner, and those frequencies are optimized to reduce the combustion instability of the afterburner and improve the reliability and life of the afterburner and the subsonic combustion ramjet.

In the description of this specification, the description with reference to the terms such as "one embodiment/mode", "some embodiments/mode", "example", "specific example", or "some examples" means that specific features, structures, materials or characteristics described in connection with the embodiment/mode or example are included in at least one embodiment/mode of the present disclosure. In this specification, the schematic representations of the above terms are not necessarily directed to the same embodiment/mode or example. Moreover, the specific features, structures, materials or characteristics described may be combined in any one or more embodiments/modes or examples in a suitable way. In addition, those skilled in the art can combine or integrate different embodiments/modes or examples described in this specification and the features of different embodiments/modes or examples if there is no conflict.

In addition, the terms "first" and "second" are only used for descriptive purposes, and should not be considered as indicating or implying relative importance or implying the number of indicated technical features. Thus, a feature delimited with "first", "second" may expressly or implicitly include at least one of those features. In the description of the present disclosure, "plurality" means at least two, such as two, three, unless expressly and specifically defined otherwise.

Those skilled in the art should understand that the above embodiments are only for clearly illustrating the present disclosure, rather than limiting the scope of the present disclosure. For those skilled in the art, other changes or modifications may also be made on the basis of the above disclosure, and these changes or modifications are still within the scope of the present disclosure.

The invention claimed is:

1. An afterburner structure with fuel injection nozzles, which comprises a casing, a central fairing cone located in the casing, a number of airfoil struts connecting the central fairing cone and the inner wall of the casing, the airfoil struts are evenly arranged around the central fairing cone; the airfoil struts are provided with a number of fuel injection nozzles, and the injection direction of the fuel injection nozzles is perpendicular to the direction of the incoming flow in the engine; each fuel injection nozzle includes a fuel injection nozzle body, an oscillating chamber in the body, a feedback channel connected with the oscillating chamber, and a spout connected with the oscillating chamber and suitable for injecting fuel to the afterburner; the fuel is output in a fan shape through the spout and is dispersed by the incoming flow, wherein in response to adjacent fuel injection nozzles having the same size, distances between adjacent fuel injection nozzles satisfy the following relationship:

$$(Li+d1)^2 - Li^2 = (Li+d1+d2)^2 - (Li+d1)^2$$

wherein, Li is the distance between a first spout which is close to the central axis of the engine and the central axis of the engine; d1 is the distance between the first spout which is close to the central axis of the engine and an adjacent second spout; d2 is the distance between the second spout and a third spout which is adjacent to the second spout; or wherein in response to the same distances between adjacent fuel injection nozzles, equivalent flow areas of fuel between adjacent fuel injection nozzles need to meet:

$$A1/[(Li+d1)^2 - Li^2] = A2/[(Li+d1+d2)^2 - (Li+d1)^2]$$

wherein, A1 is the cross-sectional area of an inlet throat of a first nozzle, and A2 is the cross-sectional area of an inlet throat of a second nozzle, Li is the distance between a first spout which is close to the central axis of the engine and the central axis of the engine; d1 is the distance between the first spout which is close to the central axis of the engine and an adjacent second spout; d2 is the distance between the second spout and a third spout which is adjacent to the second spout.

2. The afterburner structure with fuel injection nozzles according to claim 1, wherein the spout of the fuel injection nozzle is located on the wall surface of the airfoil strut, and the direction of the spout and the tangential line to the surface of the airfoil strut where the spout is located form an angle α, 20°<α<160°.

3. The afterburner structure with fuel injection nozzles according to claim 1, wherein the spout of the fuel injection nozzle is located within the range of 10% to 90% of the chord length in the cross section of the airfoil strut.

4. The afterburner structure with fuel injection nozzles according to claim 1, wherein the sweeping angle of the fan shape is from 5° to 160°.

5. The afterburner structure with fuel injection nozzles according to claim 1, wherein, the oscillating chamber is provided with a fluid inlet, and vortices are generated when main fluid of the fluid flows through the oscillating chamber, and the main fluid is forced to flow against one side wall of the oscillating chamber by the vortices, and is deflected in one direction at the spout of the oscillating chamber;

the feedback channel is connected with the oscillating chamber, and the feedback channel is used to transmit control fluid, and the control fluid drives the main fluid to flow towards the other side wall and to deflect in the other direction at the spout.

6. The afterburner structure with fuel injection nozzles according to claim 5,
wherein the fuel injection nozzle has two feedback channels, the two feedback channels are symmetrically distributed on two sides of the oscillating chamber, the feedback channels are designed for introducing branch fluid to the main fluid, and the inlet of the feedback channel is close to the spout, the outlet of the feedback channel is close to the fluid inlet of the oscillating chamber.

7. The afterburner structure with fuel injection nozzles according to claim 5,
wherein, the cross-sectional area of the middle part of the oscillating chamber is larger than that of the inlet of the oscillating chamber and that of the spout.

8. The afterburner structure with fuel injection nozzles according to claim 5, wherein, the middle of the airfoil strut is provided with a rib, the rib separates the airfoil strut into two cavities, and a middle part of the rib is provided with a fuel passage that communicates the fuel injection nozzle with a fuel pump.

\* \* \* \* \*